United States Patent
Levy et al.

(10) Patent No.: US 9,843,846 B2
(45) Date of Patent: Dec. 12, 2017

(54) WATERMARK AND FINGERPRINT SYSTEMS FOR MEDIA

(75) Inventors: Kenneth L. Levy, Stevenson, WA (US); Burt W. Perry, Lake Oswego, OR (US)

(73) Assignee: DIGIMARC CORPORATION, Beaverton, OR (US)

( * ) Notice: Subject to any disclaimer, the term of this patent is extended or adjusted under 35 U.S.C. 154(b) by 2059 days.

(21) Appl. No.: 10/028,751

(22) Filed: Dec. 21, 2001

(65) Prior Publication Data
US 2003/0012548 A1    Jan. 16, 2003

Related U.S. Application Data

(60) Provisional application No. 60/257,822, filed on Dec. 21, 2000.

(51) Int. Cl.
*G06Q 30/00* (2006.01)
*H04N 21/8358* (2011.01)
*G06F 21/12* (2013.01)
*G06F 21/36* (2013.01)
*G06F 21/62* (2013.01)
*G06Q 10/06* (2012.01)
*G06Q 30/02* (2012.01)

(52) U.S. Cl.
CPC ....... *H04N 21/8358* (2013.01); *G06F 21/125* (2013.01); *G06F 21/36* (2013.01); *G06F 21/6272* (2013.01); *G06Q 10/0637* (2013.01); *G06Q 30/0236* (2013.01); *G06F 2221/0733* (2013.01); *G06F 2221/0737* (2013.01); *G06F 2221/2111* (2013.01); *G06F 2221/2129* (2013.01); *G06F 2221/2153* (2013.01)

(58) Field of Classification Search
USPC .......................................................... 705/14
See application file for complete search history.

(56) References Cited

U.S. PATENT DOCUMENTS

| | | | |
|---|---|---|---|
| 4,547,804 A | 10/1985 | Greenberg | |
| 4,697,209 A | 9/1987 | Kiewit et al. | |
| 4,703,476 A | 10/1987 | Howard | |
| 5,347,632 A | 9/1994 | Filepp et al. | |
| 5,557,721 A | 9/1996 | Fite et al. | |
| 5,577,266 A | 11/1996 | Takahisa et al. | |
| 5,663,766 A | 9/1997 | Sizer, II | |
| 5,703,795 A | 12/1997 | Mankovitz | |
| 5,708,478 A | 1/1998 | Tognazzini | |
| 5,717,860 A | 2/1998 | Graber et al. | |
| 5,745,604 A | 4/1998 | Rhoads | |
| 5,748,763 A | 5/1998 | Rhoads | |
| 5,768,426 A | 6/1998 | Rhoads | |
| 5,794,210 A * | 8/1998 | Goldhaber et al. | 705/14 |
| 5,850,481 A | 12/1998 | Rhoads | |
| 5,855,008 A | 12/1998 | Goldhaber et al. | |
| 5,862,260 A | 1/1999 | Rhoads | |
| 5,916,024 A | 6/1999 | Von Kohorn | |
| 5,948,061 A | 9/1999 | Merriman et al. | |
| 5,956,716 A | 9/1999 | Kenner | |
| 5,978,013 A * | 11/1999 | Jones et al. | 725/23 |
| 6,002,443 A | 12/1999 | Iggulden | |
| 6,006,197 A | 12/1999 | D'Eon et al. | |
| 6,026,193 A | 2/2000 | Rhoads | |
| 6,036,601 A | 3/2000 | Heckel | |
| 6,057,872 A | 5/2000 | Candelore | |
| 6,122,392 A | 9/2000 | Rhoads | |
| 6,122,403 A | 9/2000 | Rhoads | |
| 6,173,271 B1 | 1/2001 | Goodman et al. | |
| 6,177,931 B1 | 1/2001 | Alexander et al. | |
| 6,215,526 B1 | 4/2001 | Barton et al. | |
| 6,216,112 B1 | 4/2001 | Fuller et al. | |
| 6,229,924 B1 | 5/2001 | Rhoads et al. | |
| 6,266,430 B1 | 7/2001 | Rhoads | |
| 6,285,776 B1 | 9/2001 | Rhoads | |
| 6,289,108 B1 | 9/2001 | Rhoads | |
| 6,307,949 B1 | 10/2001 | Rhoads | |
| 6,311,214 B1 | 10/2001 | Rhoads | |
| 6,325,420 B1 | 12/2001 | Zhang et al. | |
| 6,330,335 B1 | 12/2001 | Rhoads | |
| 6,338,094 B1 * | 1/2002 | Scott et al. | 709/245 |
| 6,343,138 B1 | 1/2002 | Rhoads | |
| 6,345,104 B1 | 2/2002 | Rhoads | |
| 6,353,672 B1 | 3/2002 | Rhoads | |
| 6,363,159 B1 | 3/2002 | Rhoads | |
| 6,381,341 B1 | 4/2002 | Rhoads | |
| 6,385,329 B1 | 5/2002 | Sharma et al. | |
| 6,389,055 B1 | 5/2002 | August et al. | |
| 6,389,151 B1 | 5/2002 | Carr et al. | |
| 6,400,827 B1 | 6/2002 | Rhoads | |
| 6,404,898 B1 | 6/2002 | Rhoads | |
| 6,408,082 B1 | 6/2002 | Rhoads et al. | |
| 6,421,070 B1 | 7/2002 | Ramos et al. | |
| 6,424,725 B1 | 7/2002 | Rhoads et al. | |
| 6,430,302 B2 | 8/2002 | Rhoads | |
| 6,442,285 B2 | 8/2002 | Rhoads et al. | |
| 6,446,130 B1 | 9/2002 | Grapes | |
| 6,449,377 B1 | 9/2002 | Rhoads | |
| 6,449,379 B1 | 9/2002 | Rhoads | |

(Continued)

FOREIGN PATENT DOCUMENTS

| | | |
|---|---|---|
| WO | WO9400842 | 1/1994 |
| WO | WO0070523 | 11/2000 |

(Continued)

OTHER PUBLICATIONS

U.S. Appl. No. 08/154,866, filed Nov. 18, 1993, Geoffrey B. Rhoads.

(Continued)

*Primary Examiner* — Alvin L Brown

(57) ABSTRACT

A number of novel watermarking applications, and improvements to watermarking methods, are disclosed. Included are techniques for selectively incorporating promotional messages into rendered video content, monitoring whether promotional messages are rendered or skipped, permitting payment for content upon rendering rather than receipt, controlling rendering of video to include or omit adult-themed sections, confirming a person's age by reference to a watermarked identification document, and watermarking digital cinema projections.

20 Claims, No Drawings

(56) References Cited

U.S. PATENT DOCUMENTS

| | | |
|---|---|---|
| 6,456,725 B1 | 9/2002 | Cox et al. |
| 6,496,591 B1 | 12/2002 | Rhoads |
| 6,505,160 B1 | 1/2003 | Levy et al. |
| 6,516,079 B1 | 2/2003 | Rhoads et al. |
| 6,519,352 B2 | 2/2003 | Rhoads |
| 6,522,769 B1 | 2/2003 | Rhoads et al. |
| 6,522,770 B1 | 2/2003 | Seder et al. |
| 6,522,771 B2 | 2/2003 | Rhoads |
| 6,526,449 B1 | 2/2003 | Philyaw et al. |
| 6,535,617 B1 | 3/2003 | Hannigan et al. |
| 6,535,618 B1 | 3/2003 | Rhoads |
| 6,539,095 B1 | 3/2003 | Rhoads |
| 6,542,618 B1 | 4/2003 | Rhoads |
| 6,542,620 B1 | 4/2003 | Rhoads |
| 6,542,927 B2 | 4/2003 | Rhoads |
| 6,553,129 B1 | 4/2003 | Rhoads |
| 6,553,178 B2 * | 4/2003 | Abecassis ............... 386/83 |
| 6,560,349 B1 | 5/2003 | Rhoads |
| 6,560,350 B2 | 5/2003 | Rhoads |
| 6,567,533 B1 | 5/2003 | Rhoads |
| 6,567,534 B1 | 5/2003 | Rhoads |
| 6,567,535 B2 | 5/2003 | Rhoads |
| 6,567,780 B2 | 5/2003 | Rhoads |
| 6,574,350 B1 | 6/2003 | Rhoads et al. |
| 6,574,609 B1 | 6/2003 | Downs |
| 6,580,808 B2 | 6/2003 | Rhoads |
| 6,580,819 B1 | 6/2003 | Rhoads |
| 6,587,821 B1 | 7/2003 | Rhoads |
| 6,590,996 B1 | 7/2003 | Reed et al. |
| 6,590,997 B2 | 7/2003 | Rhoads |
| 6,611,607 B1 | 8/2003 | Davis et al. |
| 6,614,914 B1 | 9/2003 | Rhoads et al. |
| 6,647,128 B1 | 11/2003 | Rhoads |
| 6,647,129 B2 | 11/2003 | Rhoads |
| 6,647,130 B2 | 11/2003 | Rhoads |
| 6,647,417 B1 | 11/2003 | Hunter |
| 6,650,761 B1 | 11/2003 | Rodriguez et al. |
| 6,654,480 B2 | 11/2003 | Rhoads |
| 6,654,887 B2 | 11/2003 | Rhoads |
| 6,675,146 B2 | 1/2004 | Rhoads |
| 6,681,028 B2 | 1/2004 | Rodriguez et al. |
| 6,681,029 B1 | 1/2004 | Rhoads |
| 6,681,393 B1 | 1/2004 | Bauminger et al. |
| 6,684,249 B1 | 1/2004 | Frerichs |
| 6,694,042 B2 | 2/2004 | Seder et al. |
| 6,694,043 B2 | 2/2004 | Seder et al. |
| 6,700,990 B1 | 3/2004 | Rhoads |
| 6,700,995 B2 | 3/2004 | Reed |
| 6,704,869 B2 | 3/2004 | Rhoads et al. |
| 6,718,046 B2 | 4/2004 | Reed et al. |
| 6,718,047 B2 | 4/2004 | Rhoads |
| 6,721,440 B2 | 4/2004 | Reed et al. |
| 6,724,912 B1 | 4/2004 | Carr et al. |
| 6,738,495 B2 | 5/2004 | Rhoads et al. |
| 6,744,907 B2 | 6/2004 | Rhoads |
| 6,750,985 B2 | 6/2004 | Rhoads |
| 6,754,377 B2 | 6/2004 | Rhoads |
| 6,757,406 B2 | 6/2004 | Rhoads |
| 6,760,463 B2 | 7/2004 | Rhoads |
| 6,763,123 B2 | 7/2004 | Reed et al. |
| 6,766,524 B1 | 7/2004 | Matheny |
| 6,768,808 B2 | 7/2004 | Rhoads |
| 6,768,809 B2 | 7/2004 | Rhoads et al. |
| 6,768,980 B1 | 7/2004 | Meyer |
| 6,771,796 B2 | 8/2004 | Rhoads |
| 6,775,392 B1 | 8/2004 | Rhoads |
| 6,778,682 B2 | 8/2004 | Rhoads |
| 6,798,894 B2 | 9/2004 | Rhoads |
| 6,804,376 B2 | 10/2004 | Rhoads et al. |
| 6,804,379 B2 | 10/2004 | Rhoads |
| 6,813,366 B1 | 11/2004 | Rhoads |
| 6,829,368 B2 | 12/2004 | Meyer et al. |
| 6,834,308 B1 | 12/2004 | Ikezoye et al. |
| 6,850,626 B2 | 2/2005 | Rhoads et al. |
| 6,879,701 B1 | 4/2005 | Rhoads |
| 6,882,738 B2 | 4/2005 | Davis et al. |
| 6,917,724 B2 | 7/2005 | Seder et al. |
| 6,920,232 B2 | 7/2005 | Rhoads |
| 6,944,298 B1 | 9/2005 | Rhoads |
| 6,947,571 B1 | 9/2005 | Rhoads et al. |
| 6,959,100 B2 | 10/2005 | Rhoads |
| 6,959,143 B2 | 10/2005 | Dupuis |
| 6,959,386 B2 | 10/2005 | Rhoads |
| 6,965,682 B1 | 11/2005 | Davis et al. |
| 6,965,683 B2 | 11/2005 | Hein, III |
| 6,970,573 B2 | 11/2005 | Carr et al. |
| 6,975,746 B2 | 12/2005 | Davis et al. |
| 6,978,036 B2 | 12/2005 | Alattar et al. |
| 6,983,051 B1 | 1/2006 | Rhoads |
| 6,987,862 B2 | 1/2006 | Rhoads |
| 6,988,202 B1 | 1/2006 | Rhoads et al. |
| 6,993,152 B2 | 1/2006 | Patterson et al. |
| 6,996,252 B2 | 2/2006 | Reed et al. |
| 7,003,132 B2 | 2/2006 | Rhoads |
| 7,003,731 B1 | 2/2006 | Rhoads et al. |
| 7,024,016 B2 | 4/2006 | Rhoads et al. |
| 7,027,614 B2 | 4/2006 | Reed |
| 7,035,427 B2 | 4/2006 | Rhoads |
| 7,044,395 B1 | 5/2006 | Davis et al. |
| 7,051,086 B2 | 5/2006 | Rhoads et al. |
| 7,054,462 B2 | 5/2006 | Rhoads et al. |
| 7,054,463 B2 | 5/2006 | Rhoads et al. |
| 7,054,465 B2 | 5/2006 | Rhoads |
| 7,055,166 B1 | 5/2006 | Logan |
| 7,058,223 B2 | 6/2006 | Cox |
| 7,062,069 B2 | 6/2006 | Rhoads |
| 7,076,084 B2 | 7/2006 | Davis et al. |
| 7,076,432 B1 | 7/2006 | Cheah et al. |
| 7,095,871 B2 | 8/2006 | Jones et al. |
| 7,111,170 B2 | 9/2006 | Rhoads et al. |
| 7,113,614 B2 | 9/2006 | Rhoads |
| 7,113,615 B2 | 9/2006 | Rhoads et al. |
| 7,123,740 B2 | 10/2006 | McKinley |
| 7,130,087 B2 | 10/2006 | Rhoads |
| 7,139,408 B2 | 11/2006 | Rhoads et al. |
| 7,142,691 B2 | 11/2006 | Levy |
| 7,158,654 B2 | 1/2007 | Rhoads |
| 7,164,780 B2 | 1/2007 | Brundage et al. |
| 7,171,016 B1 | 1/2007 | Rhoads |
| 7,171,018 B2 | 1/2007 | Rhoads et al. |
| 7,174,031 B2 | 2/2007 | Rhoads et al. |
| 7,177,443 B2 | 2/2007 | Rhoads |
| 7,181,022 B2 | 2/2007 | Rhoads |
| 7,184,570 B2 | 2/2007 | Rhoads |
| 7,185,201 B2 | 2/2007 | Rhoads et al. |
| 7,194,752 B1 | 3/2007 | Kenyon |
| 7,213,757 B2 | 5/2007 | Jones et al. |
| 7,222,105 B1 | 5/2007 | Romansky |
| 7,224,819 B2 | 5/2007 | Levy et al. |
| 7,239,734 B2 | 7/2007 | Alattar et al. |
| 7,242,790 B2 | 7/2007 | Rhoads |
| 7,248,717 B2 | 7/2007 | Rhoads |
| 7,261,612 B1 | 8/2007 | Hannigan et al. |
| 7,263,203 B2 | 8/2007 | Rhoads et al. |
| 7,266,217 B2 | 9/2007 | Rhoads et al. |
| 7,269,275 B2 | 9/2007 | Carr et al. |
| 7,286,684 B2 | 10/2007 | Rhoads et al. |
| 7,302,574 B2 | 11/2007 | Conwell et al. |
| 7,305,104 B2 | 12/2007 | Carr et al. |
| 7,305,117 B2 | 12/2007 | Davis et al. |
| 7,308,110 B2 | 12/2007 | Rhoads |
| 7,313,251 B2 | 12/2007 | Rhoads |
| 7,313,253 B2 | 12/2007 | Davis et al. |
| 7,319,775 B2 | 1/2008 | Sharma et al. |
| 7,321,667 B2 | 1/2008 | Stach |
| 7,330,564 B2 | 2/2008 | Brundage et al. |
| 7,333,957 B2 | 2/2008 | Levy et al. |
| 7,340,076 B2 | 3/2008 | Stach et al. |
| 7,349,552 B2 | 3/2008 | Levy et al. |
| 7,359,528 B2 | 4/2008 | Rhoads |
| 7,369,676 B2 | 5/2008 | Hein, III |
| 7,369,678 B2 | 5/2008 | Rhoads |
| 7,372,976 B2 | 5/2008 | Rhoads et al. |
| 7,377,421 B2 | 5/2008 | Rhoads |

(56) References Cited

U.S. PATENT DOCUMENTS

| | | |
|---|---|---|
| 7,391,880 B2 | 6/2008 | Reed et al. |
| 7,406,214 B2 | 7/2008 | Rhoads et al. |
| 7,415,129 B2 | 8/2008 | Rhoads |
| 7,418,111 B2 | 8/2008 | Rhoads |
| 7,424,131 B2 | 9/2008 | Alattar et al. |
| 7,424,132 B2 | 9/2008 | Rhoads |
| 7,427,030 B2 | 9/2008 | Jones et al. |
| 7,433,491 B2 | 10/2008 | Rhoads |
| 7,444,000 B2 | 10/2008 | Rhoads |
| 7,444,392 B2 | 10/2008 | Rhoads et al. |
| 7,450,734 B2 | 11/2008 | Rodriguez et al. |
| 7,460,726 B2 | 12/2008 | Levy et al. |
| 7,466,840 B2 | 12/2008 | Rhoads |
| 7,486,799 B2 | 2/2009 | Rhoads |
| 7,499,564 B2 | 3/2009 | Rhoads |
| 7,502,759 B2 | 3/2009 | Hannigan et al. |
| 7,505,605 B2 | 3/2009 | Rhoads et al. |
| 7,508,955 B2 | 3/2009 | Carr et al. |
| 7,515,733 B2 | 4/2009 | Rhoads |
| 7,532,741 B2 | 5/2009 | Stach |
| 7,536,034 B2 | 5/2009 | Rhoads et al. |
| 7,536,555 B2 | 5/2009 | Rhoads |
| 7,537,170 B2 | 5/2009 | Reed et al. |
| 7,539,325 B2 | 5/2009 | Rhoads et al. |
| 7,545,951 B2 | 6/2009 | Davis et al. |
| 7,545,952 B2 | 6/2009 | Brundage et al. |
| 7,548,643 B2 | 6/2009 | Davis et al. |
| 7,555,139 B2 | 6/2009 | Rhoads et al. |
| 7,562,392 B1 | 7/2009 | Rhoads et al. |
| 7,564,992 B2 | 7/2009 | Rhoads |
| 7,565,294 B2 | 7/2009 | Rhoads |
| 7,567,686 B2 | 7/2009 | Rhoads |
| 7,570,784 B2 | 8/2009 | Alattar |
| RE40,919 E | 9/2009 | Rhoads |
| 7,587,602 B2 | 9/2009 | Rhoads |
| 7,590,259 B2 | 9/2009 | Levy et al. |
| 7,593,576 B2 | 9/2009 | Meyer et al. |
| 7,602,940 B2 | 10/2009 | Rhoads et al. |
| 7,602,977 B2 | 10/2009 | Rhoads et al. |
| 7,602,978 B2 | 10/2009 | Levy et al. |
| 7,606,390 B2 | 10/2009 | Rhoads |
| 7,628,320 B2 | 12/2009 | Rhoads |
| 7,639,837 B2 | 12/2009 | Carr et al. |
| 7,643,649 B2 | 1/2010 | Davis et al. |
| 7,650,009 B2 | 1/2010 | Rhoads |
| 7,650,010 B2 | 1/2010 | Levy et al. |
| 7,653,210 B2 | 1/2010 | Rhoads |
| 7,657,058 B2 | 2/2010 | Sharma |
| 7,672,477 B2 | 3/2010 | Rhoads |
| 7,676,059 B2 | 3/2010 | Rhoads |
| 7,685,426 B2 | 3/2010 | Ramos et al. |
| 7,689,532 B1 | 3/2010 | Levy |
| 7,693,300 B2 | 4/2010 | Reed et al. |
| 7,697,719 B2 | 4/2010 | Rhoads |
| 7,702,511 B2 | 4/2010 | Rhoads |
| 7,711,143 B2 | 5/2010 | Rhoads |
| 7,711,564 B2 | 5/2010 | Levy et al. |
| 7,720,249 B2 | 5/2010 | Rhoads |
| 7,720,255 B2 | 5/2010 | Rhoads |
| 7,724,919 B2 | 5/2010 | Rhoads |
| 7,738,673 B2 | 6/2010 | Reed |
| 7,747,037 B2 | 6/2010 | Hein, III |
| 7,747,038 B2 | 6/2010 | Rhoads |
| 7,751,588 B2 | 7/2010 | Rhoads |
| 7,751,596 B2 | 7/2010 | Rhoads |
| 7,756,290 B2 | 7/2010 | Rhoads |
| 7,756,892 B2 | 7/2010 | Levy |
| 7,760,905 B2 | 7/2010 | Rhoads et al. |
| 7,761,327 B1 | 7/2010 | Hannah |
| 7,762,468 B2 | 7/2010 | Reed et al. |
| 7,787,653 B2 | 8/2010 | Rhoads |
| 7,792,325 B2 | 9/2010 | Rhoads et al. |
| 7,796,826 B2 | 9/2010 | Rhoads et al. |
| 7,822,225 B2 | 10/2010 | Alattar |
| 7,831,062 B2 | 11/2010 | Stach |
| 7,837,094 B2 | 11/2010 | Rhoads |
| 7,916,354 B2 | 3/2011 | Rhoads |
| 7,930,546 B2 | 4/2011 | Rhoads et al. |
| 7,936,900 B2 | 5/2011 | Rhoads |
| 7,945,781 B1 | 5/2011 | Rhoads |
| 7,949,147 B2 | 5/2011 | Rhoads et al. |
| 7,953,270 B2 | 5/2011 | Rhoads |
| 7,953,824 B2 | 5/2011 | Rhoads et al. |
| 7,957,553 B2 | 6/2011 | Ellingson et al. |
| 7,961,949 B2 | 6/2011 | Levy et al. |
| 7,965,864 B2 | 6/2011 | Davis et al. |
| 7,966,494 B2 | 6/2011 | Rhoads |
| 7,970,166 B2 | 6/2011 | Carr et al. |
| 7,970,167 B2 | 6/2011 | Rhoads |
| 2001/0021916 A1 | 9/2001 | Takai |
| 2001/0022848 A1 | 9/2001 | Rhoads |
| 2001/0034705 A1 | 10/2001 | Rhoads et al. |
| 2001/0037238 A1 | 11/2001 | Gotoh |
| 2001/0044744 A1 | 11/2001 | Rhoads |
| 2001/0053234 A1 | 12/2001 | Rhoads |
| 2001/0055407 A1 | 12/2001 | Rhoads |
| 2001/0056573 A1 | 12/2001 | Kovac |
| 2002/0009208 A1 | 1/2002 | Alattar et al. |
| 2002/0023020 A1 | 2/2002 | Kenyon et al. |
| 2002/0027617 A1 | 3/2002 | Jeffers et al. |
| 2002/0033844 A1 | 3/2002 | Levy et al. |
| 2002/0040323 A1 | 4/2002 | Lee |
| 2002/0040433 A1 | 4/2002 | Kondo |
| 2002/0049967 A1 | 4/2002 | Haseltine et al. |
| 2002/0071556 A1 | 6/2002 | Moskowitz |
| 2002/0072982 A1 | 6/2002 | Barton et al. |
| 2002/0073424 A1 | 6/2002 | Ward, III et al. |
| 2002/0080271 A1 | 6/2002 | Eveleens et al. |
| 2002/0080995 A1 | 6/2002 | Rhoads |
| 2002/0082731 A1 | 6/2002 | Pitman |
| 2002/0083469 A1 | 6/2002 | Jeannin |
| 2002/0092017 A1 | 7/2002 | Klosterman et al. |
| 2002/0093538 A1 | 7/2002 | Carlin |
| 2002/0106192 A1 | 8/2002 | Sako |
| 2002/0131076 A1 | 9/2002 | Davis |
| 2002/0136429 A1 | 9/2002 | Stach et al. |
| 2002/0176003 A1 | 11/2002 | Seder et al. |
| 2002/0181705 A1 | 12/2002 | Sako |
| 2002/0186886 A1 | 12/2002 | Rhoads |
| 2002/0196272 A1 | 12/2002 | Ramos et al. |
| 2003/0012548 A1 | 1/2003 | Levy et al. |
| 2003/0021440 A1 | 1/2003 | Rhoads |
| 2003/0040957 A1 | 2/2003 | Rhoads, et al. |
| 2003/0097338 A1 | 5/2003 | Mankovich |
| 2003/0105730 A1 | 6/2003 | Davis et al. |
| 2003/0130954 A1 | 7/2003 | Carr et al. |
| 2003/0138128 A1 | 7/2003 | Rhoads |
| 2003/0206632 A1* | 11/2003 | Itoh et al. .................. 380/231 |
| 2004/0005093 A1 | 1/2004 | Rhoads |
| 2004/0015608 A1 | 1/2004 | Ellis et al. |
| 2004/0057581 A1 | 3/2004 | Rhoads |
| 2004/0181671 A1 | 9/2004 | Brundage et al. |
| 2004/0190750 A1 | 9/2004 | Rodriguez et al. |
| 2004/0240704 A1 | 12/2004 | Reed |
| 2004/0263911 A1 | 12/2004 | Rodriguez et al. |
| 2004/0264733 A1 | 12/2004 | Rhoads et al. |
| 2005/0041835 A1 | 2/2005 | Reed et al. |
| 2005/0056700 A1 | 3/2005 | McKinley et al. |
| 2005/0058318 A1 | 3/2005 | Rhoads |
| 2005/0111723 A1 | 5/2005 | Hannigan et al. |
| 2005/0192933 A1 | 9/2005 | Rhoads et al. |
| 2006/0013435 A1 | 1/2006 | Rhoads |
| 2006/0028689 A1 | 2/2006 | Perry et al. |
| 2006/0041591 A1 | 2/2006 | Rhoads |
| 2006/0062386 A1 | 3/2006 | Rhoads |
| 2006/0251291 A1 | 11/2006 | Rhoads |
| 2007/0016790 A1 | 1/2007 | Brundage et al. |
| 2007/0055884 A1 | 3/2007 | Rhoads |
| 2007/0100757 A1 | 5/2007 | Rhoads |
| 2007/0108287 A1 | 5/2007 | Davis et al. |
| 2007/0172098 A1 | 7/2007 | Rhoads et al. |
| 2007/0177761 A1 | 8/2007 | Levy |
| 2007/0180251 A1 | 8/2007 | Carr et al. |
| 2007/0183623 A1 | 8/2007 | McKinley et al. |

(56) References Cited

U.S. PATENT DOCUMENTS

| | | |
|---|---|---|
| 2007/0185840 A1 | 8/2007 | Rhoads |
| 2007/0195987 A1 | 8/2007 | Rhoads |
| 2007/0201835 A1 | 8/2007 | Rhoads |
| 2007/0250194 A1 | 10/2007 | Rhoads et al. |
| 2007/0250716 A1 | 10/2007 | Rhoads et al. |
| 2007/0276841 A1 | 11/2007 | Rhoads et al. |
| 2007/0276928 A1 | 11/2007 | Rhoads et al. |
| 2008/0028223 A1* | 1/2008 | Rhoads ................... 713/176 |
| 2008/0049971 A1 | 2/2008 | Ramos et al. |
| 2008/0052783 A1 | 2/2008 | Levy |
| 2008/0121728 A1 | 5/2008 | Rodriguez |
| 2008/0131083 A1 | 6/2008 | Rhoads |
| 2008/0131084 A1 | 6/2008 | Rhoads |
| 2008/0133416 A1 | 6/2008 | Rhoads |
| 2008/0133555 A1 | 6/2008 | Rhoads et al. |
| 2008/0133556 A1 | 6/2008 | Conwell et al. |
| 2008/0140573 A1 | 6/2008 | Levy et al. |
| 2008/0149713 A1 | 6/2008 | Brundage |
| 2008/0253740 A1 | 10/2008 | Rhoads |
| 2008/0275906 A1 | 11/2008 | Rhoads et al. |
| 2008/0276286 A1 | 11/2008 | Robinson |
| 2008/0292134 A1 | 11/2008 | Sharma et al. |
| 2008/0319857 A1* | 12/2008 | Dobbins et al. ................ 705/14 |
| 2008/0319859 A1 | 12/2008 | Rhoads |
| 2009/0012944 A1 | 1/2009 | Rodriguez et al. |
| 2009/0125475 A1 | 5/2009 | Rhoads et al. |
| 2009/0138484 A1 | 5/2009 | Ramos et al. |
| 2009/0177742 A1 | 7/2009 | Rhoads et al. |
| 2009/0252401 A1 | 10/2009 | Davis et al. |
| 2009/0286572 A1 | 11/2009 | Rhoads et al. |
| 2009/0304358 A1* | 12/2009 | Rashkovskiy et al. ......... 386/95 |
| 2010/0008534 A1 | 1/2010 | Rhoads |
| 2010/0008536 A1 | 1/2010 | Rhoads |
| 2010/0008537 A1 | 1/2010 | Rhoads |
| 2010/0008586 A1 | 1/2010 | Meyer et al. |
| 2010/0009722 A1 | 1/2010 | Levy et al. |
| 2010/0021004 A1 | 1/2010 | Rhoads |
| 2010/0027969 A1 | 2/2010 | Alattar |
| 2010/0036881 A1 | 2/2010 | Rhoads et al. |
| 2010/0045816 A1 | 2/2010 | Rhoads |
| 2010/0046744 A1 | 2/2010 | Rhoads et al. |
| 2010/0062819 A1 | 3/2010 | Hannigan et al. |
| 2010/0119108 A1 | 5/2010 | Rhoads |
| 2010/0131767 A1 | 5/2010 | Rhoads |
| 2010/0138012 A1 | 6/2010 | Rhoads |
| 2010/0142752 A1 | 6/2010 | Rhoads et al. |
| 2010/0146285 A1 | 6/2010 | Rhoads et al. |
| 2010/0163629 A1 | 7/2010 | Rhoads et al. |
| 2010/0172540 A1 | 7/2010 | Davis et al. |
| 2010/0185306 A1 | 7/2010 | Rhoads |
| 2010/0198941 A1 | 8/2010 | Rhoads |
| 2010/0257041 A1* | 10/2010 | Hannah et al. ............ 705/14.19 |
| 2010/0281545 A1 | 11/2010 | Levy |
| 2010/0322035 A1 | 12/2010 | Rhoads et al. |
| 2010/0329506 A1 | 12/2010 | Hein, III |
| 2011/0007936 A1 | 1/2011 | Rhoads |
| 2011/0026777 A1 | 2/2011 | Rhoads et al. |
| 2011/0051998 A1 | 3/2011 | Rhoads |
| 2011/0058707 A1 | 3/2011 | Rhoads et al. |
| 2011/0062229 A1 | 3/2011 | Rhoads |
| 2011/0091066 A1 | 4/2011 | Alattar |
| 2011/0110555 A1 | 5/2011 | Stach |
| 2011/0231877 A1* | 9/2011 | Redling et al. ................. 725/42 |
| 2011/0302038 A1* | 12/2011 | Angles et al. ............ 705/14.66 |
| 2012/0042276 A1* | 2/2012 | Shuster ......................... 715/781 |
| 2012/0144436 A1* | 6/2012 | Berberet et al. ................ 725/88 |

FOREIGN PATENT DOCUMENTS

| | | |
|---|---|---|
| WO | WO0070585 | 11/2000 |
| WO | WO0213073 | 2/2002 |

OTHER PUBLICATIONS

U.S. Appl. No. 08/215,289, filed Mar. 17, 1994, Geoffrey B. Rhoads.

U.S. Appl. No. 09/150,147, filed Sep. 9, 1998, Geoffrey B. Rhoads.

U.S. Appl. No. 09/151,492, filed Sep. 11, 1998, Bruce L. Davis, et al.

U.S. Appl. No. 09/337,590, filed Jun. 21, 1999, Geoffrey B. Rhoads.

U.S. Appl. No. 09/343,101, filed Jun. 29, 1999, Bruce L. Davis, et al.

U.S. Appl. No. 09/343,104, filed Jun. 29, 1999, Tony F. Rodriguez, et al.

U.S. Appl. No. 09/413,117, filed Oct. 6, 1999, Geoffrey B. Rhoads.

U.S. Appl. No. 09/482,749, filed Jan. 13, 2000, Geoffrey B. Rhoads.

U.S. Appl. No. 09/491,534, filed Jan. 26, 2000, Bruce L. Davis, et al.

U.S. Appl. No. 09/496,380, filed Feb. 2, 2000, Geoffrey B. Rhoads.

U.S. Appl. No. 09/507,096, filed Feb. 17, 2000, Geoffrey B. Rhoads, et al.

U.S. Appl. No. 09/515,826, filed Feb. 29, 2000, Geoffrey B. Rhoads.

U.S. Appl. No. 09/552,998, filed Apr. 19, 2000, Tony F. Rodriguez, et al.

U.S. Appl. No. 09/567,405, filed May 8, 2000, Geoffrey B. Rhoads, et al.

U.S. Appl. No. 09/574,726, filed May 18, 2000, Geoffrey B. Rhoads.

U.S. Appl. No. 09/629,649, filed Aug. 1, 2000, J. Scott Carr, et al.

U.S. Appl. No. 09/633,587, filed Aug. 7, 2000, Geoffrey B. Rhoads, et al.

U.S. Appl. No. 09/636,102, filed Aug. 10, 2000, Daniel O. Ramos, et al.

U.S. Appl. No. 09/689,289, filed Oct. 11, 2000, Geoffrey B. Rhoads, et al.

U.S. Appl. No. 09/697,015, filed Oct. 25, 2000, Bruce L Davis, et al.

U.S. Appl. No. 09/697,009, filed Oct. 25, 2000, Bruce L. Davis, et al.

U.S. Appl. No. 13/084,981, filed Apr. 4, 2011, Geoffrey B. Rhoads.

\* cited by examiner

WATERMARK AND FINGERPRINT SYSTEMS FOR MEDIA

RELATED APPLICATION DATA

This application claims priority to provisional application No. 60/257,822, filed Dec. 21, 2000.

FIELD OF THE INVENTION

The present disclosure memorializes various improvements relating to digital watermarking technology and applications.

BACKGROUND OF THE INVENTION

Digital watermarking is the science of encoding physical and electronic objects with plural-bit digital data, in such a manner that the data is essentially hidden from human perception, yet can be recovered by computer analysis. In physical objects, the data may be encoded in the form of surface texturing, or printing. Such marking can be detected from optical scan data, e.g., from a scanner or web cam. In electronic objects (e.g., digital audio or imagery—including video), the data may be encoded as slight variations in sample values. Or, if the object is represented in a so-called orthogonal domain (also termed "non-perceptual," e.g., MPEG, DCT, wavelet, etc.), the data may be encoded as slight variations in quantization values or levels. The present assignee's U.S. Pat. No. 6,122,403, and application Ser. No. 09/503,881, are illustrative of certain watermarking technologies.

Watermarking can be used to tag objects with a persistent digital identifier, and as such finds myriad uses. Some are in the realm of device control—e.g., tagging video data with a do-not-copy flag that is respected by compliant video recorders. (The music industry's Secure Digital Music Initiative (SDMI), and the motion picture industry's Copy Protection Technical Working Group (CPTWG), are working to establish standards relating to watermark usage for device control.) Other watermark applications are in the field of copyright communication, e.g., indicating that an audio track is the property of a particular copyright holder.

Other watermark applications encode data that serves to associate an object with a store of related data. For example, an image watermark may contain an index value that serves to identify a database record specifying (a) the owner's name; (b) contact information; (c) license terms and conditions, (d) copyright date, (e) whether adult content is depicted, etc., etc. (The present assignee's MarcCentre service provides such functionality.) Related are so-called "connected content" applications, in which a watermark in one content object (e.g., a printed magazine article) serves to link to a related content object (e.g., a web page devoted to the same topic). The watermark can literally encode an electronic address of the related content object, but more typically encodes an index value that identifies a database record containing that address information. Application Ser. No. 09/571,422 details a number of connected-content applications and techniques.

One problem that arises in many watermarking applications is that of object corruption. If the object is reproduced, or distorted, in some manner such that the content presented for watermark decoding is not identical to the object as originally watermarked, then the decoding process may be unable to recognize and decode the watermark. To deal with such problems, the watermark can convey a reference signal. The reference signal is of such a character as to permit its detection even in the presence of relatively severe distortion. Once found, the attributes of the distorted reference signal can be used to quantify the content's distortion. Watermark decoding can then proceed—informed by information about the particular distortion present.

The assignee's application Ser. Nos. 09/503,881 and 09/452,023 detail certain reference signals, and processing methods, that permit such watermark decoding even in the presence of distortion. In some image watermarking embodiments, the reference signal comprises a constellation of quasi-impulse functions in the Fourier magnitude domain, each with pseudorandom phase. To detect and quantify the distortion, the watermark decoder converts the watermarked image to the Fourier magnitude domain and then performs a log polar resampling of the Fourier magnitude image. A generalized matched filter correlates the known orientation signal with the re-sampled watermarked signal to find the rotation and scale parameters providing the highest correlation. The watermark decoder performs additional correlation operations between the phase information of the known orientation signal and the watermarked signal to determine translation parameters, which identify the origin of the watermark message signal. Having determined the rotation, scale and translation of the watermark signal, the reader then adjusts the image data to compensate for this distortion, and extracts the watermark message signal as described above.

With the foregoing by way of background, the specification next turns to the various improvements. It will be recognized that these improvements can typically be employed in many applications, and in various combinations with the subject matter of the patent documents cited herein.

DETAILED DESCRIPTION

Watermarks in Video and Broadcast Programming

Several novel uses of watermarks relate to video and broadcast programming. For example, a watermark may be placed at a certain location in content (e.g., audio or video), and serve to trigger insertion or play of an advertisement. Conditional rules can be specified (e.g., play advertisement X if the current hour is between 9:00 p.m. and 5:00 a.m.; play advertisement Y if the current hour is between 5:00 a.m. and 9:00 p.m.).

Another is to charge differently for content, depending on whether or not it is rendered with advertisements included. For example, if a viewer fast-forwards through advertising in a video program, then a charge is assessed for the viewing. Else no charge (or a reduced charge) is assessed. (A related concept is disclosed in application Ser. No. 09/337,590, filed Jun. 6, 1999.)

Watermarks (e.g., watermark advertising triggers) may be counted by a system and, when a threshold of number or types of watermarks detected is reached, playback of specific advertising or other material is completed. Thus, if a viewer has apparently watched five advertisements, no more advertisements are inserted for a predetermined period (or through the end of the current content). Or if the viewer has watched two automobile ads (or two Ford ads), no further automobile ads will be presented. (Conversely, the viewer's willingness to watch automobile ads may indicate that such ads should be inserted in preference to another class of ads over which the viewer habitually fast-forwards or otherwise does not view, e.g., for financial service institutions.) In addition, the watermark may have a date-time stamp, or time counter that can help determine how long the content has been playing. For example, the user may have started viewing at 2000 seconds, and at 2600 seconds, or 10 minutes of viewing, an advertisement is triggered.

A variation of this concept involves personalized advertisement delivery triggered by watermarks. For example, advertisements tailored to particular consumer profiles (e.g., based on zip codes or other known general or specific demographic information) may be downloaded to a Tivo-like Personal Video Recorder (PVR) through known video sources (e.g., a set top box, coupled to cable, satellite, etc.). These tailored advertisements can be inserted based upon detection of specific watermark triggers (e.g., akin to how local advertising is inserted in national network programming). Or generic advertising already included in the content can be watermarked and, if a tailored advertisement is locally stored and has a corresponding watermark, it can be substituted for the generic advertisement. Or after three generic advertisements, a personalized advertisement may be inserted. Many other such variations are naturally possible.

Instead of caching tailored advertising in a Tivo-like device, such advertising can be distributed otherwise. One example is a DVD video disk mailed to the consumer. Playback of advertising from this disk can be triggered by watermark signals in other content, and—as above—can benefit the consumer by reduced cost- or free-viewing of otherwise premium content.

Instead of substituting locally-stored advertising in externally received content, the opposite arrangement can be employed. A DVD video, a PVR replay, etc., can be periodically interrupted (based on watermark trigger signals), and advertising from another source (e.g., cable, wireless, etc.) may be inserted.

The advertising can be tailored to the viewer, or can be tailored to the programming. Thus, for example, programming showing a golf tournament may be so-indicated by a watermark, and this watermark can thereby signal that golf-related advertising should be inserted. (The watermark may convey an index value that is associated—through a remote data store—with the programming subject, or the watermark may literally convey a code corresponding to the programming subject.)

Playback of advertising may enable access to other content or capabilities. This can occur by requiring a number or type of watermark to be read (e.g., beginning/middle/end) before viewing of other content is permitted (akin to requiring theatre-goers to watch trailers for upcoming movies before viewing the featured movie). Once the watermarks are detected from the requisite advertisements, then the viewer is permitted to access additional content, or exercise other capabilities.

A secondary watermark (in addition to a primary content owner or creator watermark) can be employed to enable broadcasters, cable operators, content aggregators, etc., to add connected content functionality—directing users back to prearranged web sites, etc. (e.g., a web site maintained by the broadcaster, aggregator, etc.). Such functionality may be in addition to the simultaneous linking capabilities available to the content owner/creator's web site). Set top boxes, DVD/CD players or other devices can be able to detect both types of watermarks, and route users to either class of destination based on pre determined rules or customer preference.

Connected Content and Peer-to-Peer Sharing

It is not clear that Napster-like sharing of movies will be as popular as such sharing of audio. Regardless, it seems watermarking can play an important role.

Unlike audio, most people are not accustomed to "owning" a movie. Instead, rental or PPV is the dominant user experience.

One particular approach is to provide the content data for free, and assess a charge for its playback (rendering). The charge can be triggered upon detection of a watermark.

A watermark can also be used for connected-content purposes. One such application permits the user to obtain (e.g., download) movies and songs that are mentioned, or relate to, the video content being viewed. The watermark can be conveyed in the audio track, and/or the video content (or each could include one or more different marks). In one scenario, a device like that disclosed in application Ser. No. 09/476,686 (filed Dec. 30, 1999) is used to listen to ambient sound, and decode any watermark in such sound. When a watermark is detected indicating, e.g., that the viewer is watching the movie Mission Impossible, the device and related software can search for related content. This can be accomplished, e.g., by using an index value conveyed by the watermark to access a store of meta data associated with the movie. That store can contain the title of the movie, titles of pre-quels, sequels, names of stars, name of the movie director, geographic locations featured, featured music, etc. A catalog of available audio and/or video can then be searched in accordance with such meta data to identify related content. The results of the search can be presented to the viewer, who can choose one or more for linking. Alternatively, instead of searching based on keywords, a data store associated with the watermark index value can directly identify related content, e.g., by title and web address. Again, this information can be presented to the user for further linking. A great variety of other such arrangements are naturally possible.

In some such arrangements, the connected content does not have a sole, known source. Instead, it may be located in a peer-to-peer media sharing service, akin to Napster, and downloaded from whatever source the user—or some computer-executed procedure—dictates.

Likewise, the original source video may be obtained by the user from a peer-to-peer network (e.g., like a video-Napster). Again, the content may be obtained for free, and a charge levied only when the content is viewed. This charge can be triggered by watermark detection, or using various non-watermark techniques. The charge may be fixed, but can alternatively be on a per-increment of viewing (e.g., a nickel charged for every 5 minutes rendered to the user). Still further, the content can be provided in streaming form, rather than as one or more discrete files.

In this and many content delivery systems, streaming can be used as an alternative to file transfer when the recipient's rights to have a file copy of the content cannot be confirmed.

The advantage of a peer-to-peer architecture is that a massive central server needn't serve the requests of all possible users. Instead, this function is spread over a widely distributed network, providing consumers with a service that is faster and—potentially—less expensive.

Connected Content and Advertising

Another concept is to include connected-ads within (as opposed to interrupting) the entertainment. If someone "clicks" on (or during) the ad, or otherwise activates same, then they receive money towards watching the TV show. If someone doesn't want to click on the ad, they pay for the show. The ads are linked to information via watermarks.

For example, if Ross in the TV show Friends is drinking a Coke during the show, then clicking during that time will present the viewer with linking options, one of which is viewing the web page of Coke. It will be identified that this is an advertising link, possibly with an ad credit symbol such as a $. If the user clicks on this option, they will receive some benefit, such as x cents deducted from their monthly TV bill. Thus, if they want to watch TV without ads, they just don't click on ads and pay more for the monthly TV bill.

Alternatively, the user could click on the ad link and bookmark it for usage at a later time, at which time the user would receive their credit. In addition, if different video objects are marked with different watermarks, then clicking on the Coke can can take the user directly to the ad page, or bookmark same for future use.

One advantage of this approach over traditional ad models is that the consumer can decide how much advertising to watch and pay accordingly, while watching the same show as other consumers who want advertising. In other words, you don't need different shows and channels, such as a premium show and related channel and a free show and related channel.

While watermarks are preferred in this application to convey data related to the connected content (e.g., advertising), other known data transmission mechanisms can be used (e.g., Multicast IP, vertical blanking interval-based systems, file headers in MPEG, etc.).

Different on-screen signals (icons, etc.) can be used to indicate to the viewer that advertising/information/money saving opportunities exist for the viewer, and that the viewer can earn credits towards purchasing merchandise by watching the ad or viewing more information (akin to Green-Stamps for those old enough to remember them). To continue the Coke idea, clicking on the Coke can on the TV could print a coupon for $0.50 off a 6 pack of Coke at 7 Eleven.

Watermarks in Media Customization and Control;
Age-Based Systems

Another application of watermark is in tailoring audio or video content presented to consumers, e.g., withholding adult materials from juvenile audiences.

A rating field, such as two bits (X, R, PG, and G), can be included in the watermark payload and identify the rating of the corresponding content on a per-video-frame (or per-audio-excerpt). The watermark reader (optionally using read-ahead capabilities) can cause the rendering device to act appropriately for non-appropriate content, such as removing adult rated-X frames. If the watermark also contains a unique ID, a secondary database can be consulted to determine the network location of alternate frames/excerpts that can then be substituted for the objectionable content. If no ID is present, default filler material can be substituted, either from a remote source, or from the consumer's own data stores (e.g., a TiVo device).

Detection of the adult content watermark bit(s) can be performed by the consumer device, or upstream in the content distribution network (e.g., in a hub, firewall, router, server, operating system, etc.) Many corporations will want the firewall to detect the adult content so that employees don't waste company time and money on viewing inappropriate materials. In addition, viewing adult content, such as pornography or violent scenes, can produce internal human resource legal problems for corporations.

While adult content is one class of content, the use of watermarks to categorize content, e.g., for filtering purposes, finds other applications as well. One is indexing. Content can be watermarked with data indicating content classification (or with an ID that permits its content to be ascertained by checking a corresponding database record). Search engines can then index content based during web crawling.

The concept is that the watermark categorizes the content. Systems then use the watermark to make content specific decisions, like sorting, indexing, controlling playback, etc. The systems can be filters at various stages—operating system, driver, application, firewall, router, etc. The systems can be search engines or crawlers, etc.

In systems like Digimarc's Image Commerce system, in which content providers pay an annual fee so they can watermark a unique identifier into their content (which identifier permits customers to link back to the content's source), the fee can be waived for adult content. Instead of including a unique ID, the watermark payload can include a default ID. If customers link using the default ID, they are routed to a default page shared by all, e.g., adult content providers. The advantage, of course, is that a financial cost associated with watermarking is waived for such content, hopefully assisting in the ubiquitous "adult" marking of objectionable content.

(Related disclosure can be found in application Ser. Nos. 09/636,102 and 09/706,505.)

Identification documents, such as drivers' licenses, credit cards, and other identity tokens, can include a watermark that encodes—or otherwise represents—the holder's birthdate. By displaying the document to a web camera and associated application, the birthdate can be decoded and used to authorize viewing, e.g., of R-rated content. This card can also be used to confirm a user's age for online gambling. In addition, the birthdate can allow a user to obtain pornography and gambling, anonymously while enabling the site owner to not have to worry about under age participants.

The birth date can also include an ID that can be used to identify the person needs to be identified, such as for online voting or access to restricted information on the web.

The card could be something mailed to the person after verifying their birth date, and identification if a user ID is included. The card could even be emailed and printed by the end user, although copying such a card will be easier.

Finally, the card may save the birth date via other methods, such as on a magnetic strip or through smart card chip technology, or with a combination of technologies, including watermark. The card may also contain a frail watermark such that a duplicate can be detected.

Watermarks and Media Distribution

The following section details particular watermark-related actions that can be utilized when distributing digital content.

1. Identify (ID) content with watermark
2. Use watermarked ID to trigger automated purchase and file transfer operation from source to user's machine, digital locker, etc. (e.g., press button while listening to song to trigger transaction), may include some notions of digital money transaction (see, e.g., application Ser. No. 09/337,590)
3. Embed ID in an automated fashion on users' machines: search for content on drive, look up ID from local or network database (with either fingerprint or TOC type indicators), embed ID into content One way of identifying audio and video content—apart from watermarks—is so-called "fingerprint" technology. As detailed in numerous published references, such technology generally works by characterizing content by some process that usually—although not necessarily—yields a unique data string. Innumerable ways can be employed to generate the data string. What is important is (a) its relative uniqueness, and (2) its relatively small size. Thus a 1Mbyte audio file may be distilled down to a 2 Kbyte identifier.

(One technique of generating a fingerprint—seemingly not known in the art—is to select frames (video or MP3, etc.) pseudorandomly, based on a known key, and then performing a hashing or other lossy transformation process on the frames thus selected.)

One longstanding application of such technology has been in monitoring play-out of radio advertising. Advertisements are "fingerprinted," and the results stored in a database. Monitoring stations then process radio broadcasts looking for audio that has one of the fingerprints stored in the database. Upon finding a match, play-out of a given advertisement is confirmed.

Some fingerprinting technology may employ a "hash" function to yield the fingerprint. Others may take, e.g., the most significant bit of every $10^{th}$ sample value to generate a fingerprint. Etc., etc. A problem arises, however, if the content is distorted. In such case, the corresponding fingerprint may be distorted too, wrongly failing to indicate a match.

In accordance with this aspect of the present technology, content is encoded with a steganographic reference signal by which such distortion can be identified and quantized. If the reference data in a radio broadcast indicates that the audio is temporally scaled (e.g., by tape stretch, or by psychoacoustic broadcast compression technology), the amount of scaling can be determined. The resulting information can be used to compensate the audio before fingerprint analysis is performed. That is, the sensed distortion can be backed-out before the fingerprint is computed. Or the fingerprint analysis process can take the known temporal scaling into account when deriving the corresponding fingerprint. Likewise with distorted image and video. By such approaches, fingerprint technology is made a more useful technique.

(Pending application 09/452,023, filed Nov. 30, 1999, details such a reference signal (sometimes termed a "grid" signal, and its use in identifying and quantizing distortion. Pending application 09/689,250 details various fingerprint techniques.)

In a variant system, a watermark payload—in addition to the steganographic reference signal—is encoded with the content. Thus, the hash (or other fingerprint) provides one identifier associated with the content, and the watermark provides another. Either can be used, e.g., to index related information (such as connected content). Or they can be used jointly, with the watermark payload effectively extending the ID conveyed by the hash (or vice versa).

A technique similar to that detailed above can be used in aiding pattern recognition. Consider services that seek to identify image contents, e.g., internet porn filtering, finding a particular object depicted among thousands of frames of a motion picture, or watching for corporate trademarks in video media. (Cobion, of Kassel, Germany, offers some such services.) Pattern recognition can be greatly for-shortened if the orientation, scale, etc., of the image are known. Consider the Nike swoosh trademark. It is usually depicted in horizontal orientation. However, if an image incorporating the swoosh is rotated 30 degrees, its recognition is made more complex.

To redress this situation, the original image can be steganographically encoded with a grid (calibration) signal as detailed in the '023 application. Prior to performing any pattern recognition on the image, the grid signal is located, and indicates that the image has been rotated 30 degrees. The image can then be counter-rotated before pattern recognition is attempted.

Fingerprint technology can be used in conjunction with watermark technology in a variety of ways.

One is to steganographically convey a digital object's fingerprint as part of a watermark payload. If the watermark-encoded fingerprint does not match the object's current fingerprint, it indicates the object has been altered.

A watermark can also be used to trigger extraction of an object's fingerprint (and associated action based on the fingerprint data). Thus, one bit of a watermark payload, may signal to a compliant device that it should undertake a fingerprint analysis of the object.

In other arrangements, the fingerprint detection is performed routinely, rather than triggered by a watermark. In such case, the watermark can specify an action that a compliant device should perform using the fingerprint data. (In cases where a watermark triggers extraction of the fingerprint, a further portion of the watermark can specify a further action.) For example, if the watermark bit has a "0" value, the device may respond by sending the fingerprint to a remote database; if the watermark bit has a "1" value, the fingerprint is stored locally.

Still further, frail watermarks can be used in conjunction with fingerprint technology. For example, if a frail watermark is detected, then a fingerprint analysis is performed; else not. And/or, the results of a fingerprint analysis can be utilized in accordance with information conveyed by a frail watermark.

(Frail watermarks are disclosed, e.g., in applications 09/234,780, 09/433,104, 60/198,138, 09/616,462, 09/645,779, 60/232,163, 09/689,293, 09/689,226, and <attorney docket P0244, filed Nov. 8, 2000, entitled, "AUTHENTICATION WATERMARKING USING SORTING ORDER EMBEDDING TO EMBED A COMPRESSED BIT STREAM IN ANOTHER SIGNAL>.")

4. Embed ID at time of rip, where the file transfer "client" (which acts as both client and server) includes read/write functionality. The write function can be used for supplementing previous embedding by content owner or ripper software (see, e.g., application Ser. Nos. 09/563,664 and 09/578,551). During download, adding the unique ID from a fingerprint and secondary second database.

5. Check file for proper naming, labeling before adding to file sharing registry of content items (songs)

6. Update a listing of name—ID mapping, increment registry in real time

7. Mark file with user's ID during a download, then if user attempts to add to a file sharing system, the system knows the user and informs them how the user can and cannot use the file; e.g., refuse registration 8. Distinguish level of service in subscription service by watermark label (see, e.g., application Ser. No. 09/620,019)

9. check integrity of file: free of content bombs and viruses (see, e.g., application Ser. No. 09/620,019)

10. Use date-time stamp to control changing of rights over time (see, e.g., application Ser. No. 60/232,163). The date time stamp can be referenced to Jan. 1, 2000 and incremented from there, possibly in seconds or minutes.

11. During transfer of a content object (e.g., by streaming or file transfer), a fingerprint or meta-tag obtained from the object can be parsed from the in-transfer object and used as an ID to access a database record. The database record can contain pre-existing information that can be read by the client device (e.g., to ascertain permitted usage rights). Or the database record can be written, e.g., with the date, time, username, etc., relating to the transfer.

12. Audio excerpts (e.g., individual MP3 frames) can be hashed (e.g., yielding 16 bits). This hash code can be used to modulate bits—making it more difficult to change the audio.
13. Different beginning and ending frame payloads to determine successful download, or have header with number of frames and make sure matches.
14. Stream the content when the user does not have rights to download
15. Hash audio in each frame to two bytes and use to modulate bits because it makes it more difficult to change the audio without detecting this in the header or watermark ID.
16. Choose frames or data within frames randomly, based upon a PN sequence to make it more difficult to change audio without detecting this in the header or watermark ID.
17. Branding the label by presenting the label's logo each time the audio is played or downloaded.
18. Linking back to the retailer where you bought the music for connected-content apps with file sharing, possibly while downloading the content or while playing the content.
19. Automatically generating the ID from the TOC ID and track ID.

Multiply-Watermarked Video

Application Ser. No. 09/597,209 details how different video "objects" within a frame (e.g., as utilized in MPEG4) can be separately watermarked.

As a further extension, consider two different types of watermarking techniques. One type is a "background" watermark that essentially is fixed in reference system relative to the overall frame. It may move as the overall scene moves, or just sit there fixed. The other type of watermark travels with MPEG4 objects.

In the latter system, there can also be a watermark which explicitly moves with an object, but always re-watermarks itself as a function of the global frame reference. In other words, even as an object moves relative to the global frame reference, so too can its watermark signal adapt, so that the overall global watermark is uniform across the frame.

These two systems are not necessarily mutually exclusive. With two watermarks being applied, one level can remain essentially fixed, painting the whole frame, while the other follows individual object patches and may contain object-specific watermarks.

One such approach ties an MPEG4 object locator reference coordinate system into the subliminal grid (calibration signal) detailed in application Ser. No. 09/452,023.

Device Control Watermarks

It is believed that watermarks will first find widespread deployment in audio and video markets as part of copy control system (e.g., the watermark may signal to a compliant consumer device, "Do not Copy," "Copy Once," or "Copy Freely," etc.). Many other applications of watermarking may then follow (e.g., "connected content" applications).

The watermark detection system in the consumer device can be implemented in hardware or software. However, it may be advantageous to have a split arrangement, e.g., with the copy control watermark being detected by hardware, and the connected content watermark being detected by software.

The circuitry to detect the copy control watermark may be comparatively simple, since the copy control watermark payload is relatively small (e.g., 1-8 bits). Speed is important in this application to assure that useful clips of media are not wrongfully copied. The software to detect the other, added functionality, software, in comparison, can be relatively complex—both to handle a longer watermark payload, and to perform more complex response actions.

In some embodiments, hardware circuitry can detect merely the presence of a watermark, but not decode it. The presence of the watermark can signal something about the media signal (e.g., that it should not be copied, or it is adult content), or may simply trigger the further step of a watermark reading operation (e.g., reading a copy control watermark, or an added functionality watermark). The presence of the watermark can be detected by various means, including detection of the calibration signal disclosed in application Ser. No. 09/452,023, or by sensing some other signal attribute.

Extended payloads have been proposed so as to enable additional functionality (e.g., specifying internet addresses to which consumers can link for additional content or information, specifying the number of times a video can be viewed, specifying the period of time in which an audio selection can be played, specifying database records in which metadata associated with the content (including any of the foregoing information) may be stored, etc.)

As such, watermark decoding is performed by two decoders. A first, hardware, decoder, is used to read a first set of bits (typically associated with copy control functionality). A second, software, decoder, is used to read a second set of payload bits (typically associated with extended functionality that does not involve basic copy control operations).

Typically, although not necessarily, the two watermarks payloads are conveyed by two distinct watermarks, using different watermarking algorithms or different key (noise) data (i.e., they are not simply different bits of a single watermark). The two watermarks may be applied to the content sequentially, or in a single operation.

An advantage to the above-described approach is security. Software is easier to reverse engineer than hardware. A hacker who reverse-engineers a software decoder to interfere with the extended payload, and associated functionality, does not thereby compromise the hardware detector, and the associated copy control functionality. Moreover, if different watermarking algorithms are used, information gleaned in reverse-engineering the extended watermark or its software decoder does not compromise the security of the copy control watermark or its hardware decoder.

This approach also reduces the gate count of the hardware decoder—an important consideration in mass produced consumer electronic devices. Moreover, it permits the same hardware to be employed in a range of different products—products that are differentiated by software-provided functionality.

This approach can be used with both audio and video content. Moreover, it is also applicable to still image content, including conventional graphic files (e.g., JPEG'd photographs) and scanner data corresponding to paper documents (e.g., generated by a photocopier).

Watermarks and Cinema

Watermarking has many uses in the field of Digital Cinema. Some work is being done in this field by the Digital Cinema working group of the Society of Motion Picture and Television Engineers (SMPTE).

In one arrangement, a watermark is dynamically embedded in the video, in the pipeline of data to projector, thus embedding information such as a) what video disc or other media is this (each piece of media may have a unique identifier so that movie distributors can track them) b) what theater the current projector belongs to, and c) what time and date the movie is being shown. Future digital camcorders etc. could have a watermark reader chip in them, and when it detects a watermark in the scene it is filming, the camera could prevent recording. For older camcorders which would not have this hardware, the presence of these unique id's allows authorities to determine at exactly what theater the illegal filming took place. Since many of the pirated movies are taken from the projector booth so as to get a clean line of sight of the film, and to tap into superior audio, the date and time data could be used to determine who was running that projector when the illegal copy was made.

In another arrangement, watermarking can be effected in the auditorium (e.g., for showtime/location serialization, etc.) by use of a slide with a variable transparency in front of the projector. Desirably, this wouldn't be put in front of the lens, as this is near the conjugate plan of the optical system, and unless the watermark is purely in the Fourier domain, much would be lost. Generally the watermark added signal should be in the focal plane. This is the least expensive approach and easy to change often. These two advantages are important because Digital Cinemas don't want to spend any extra money, especially on content protection that may degrade quality. Furthermore some digital cinema set-ups use a digitally controlled gate in the focal plane of the projector. The local watermark can then simply be an adder to the digital input for the cinema In some cases, such a slide may be visible because the watermark is not moving or changing. To redress this, the system could use an LCD array or light valve that changes over time. Some property of the watermark would change from frame to frame, perhaps the origin of the grid, perhaps the payload, and thus make the watermark appear as time dependent noise rather than fixed pattern noise.

The watermark can be relatively weak since the ID only need to be detected somewhere in the movie, and watermark signal from multiple frames can be used to aid the detection. Reliable detection once every, e.g., 5 or fifteen minutes, can employ thousands of frames of data (e.g., at 25 frames per second).

On the production and distribution side, of course, a watermark can be applied at any stage of the process—the camera that first captures raw footage, the non-linear editing machine that produces the final editor's cut, the mastering machine that produces distributed content, the transmission system that distributes the final content to the theatres, etc., etc.

In addition to watermarks encoded at time of production and distribution, a further watermark may be added at the theatre, e.g., including time and date of screening.

In cinemas using micro mirror projection devices, the mirrors provide a vehicle to insert subtle changes representing watermark data. For example, each mirror element's reflectivity property can be tailored to as to uniquely serialize each projector.

Of course, the foregoing can also be realized using audio watermarks instead of, or in addition to, video watermarks. In bootlegs made from the projection booth, the sound to the front speakers is usually tapped. If desired, the rear speakers can be provided the same watermark data in opposite phase, causing the watermark to cancel in the auditorium. This may permit a higher energy encoding of the audio watermark than would otherwise be the case.

Finally, cinema screens have holes for sound penetration. By re-arranging the size and/or position of holes, an essentially imperceptible watermark pattern can be formed that serves to identify the particular screen (and cinema).

Watermarks and Digital Object Generation Tools

Document generation tools continue to increase in sophistication and complexity. Adobe offers a variety of such tools, including their InDesign software. Watermarking can advantageously be effected in such systems.

In such environments, a document may be created using a variety of tools—most of which can insert a watermark. One program may use as input the output of one or more other programs (i.e., "compositing").

To better handle watermarking in this environment, a watermarking function (e.g., a PostScript-like command) can be provided in the tools. This function is called with parameters specifying the desired features of the watermark information, e.g., payload, robustness level, masks to be used. At rendering time, such as for on-screen viewing, printing proofs, or ripping the final version, the watermark is actually added as digital data. In such environment, the embedder knows the properties of the rendering device, such as the printer, and appropriately adjust its embedding accordingly. With this concept, watermarks are not lost during composite operations, and watermarks can be embedded in vector (or line) art. Moreover, the color manager at the ripping stage may be the best entity to add the watermark.

This idea likewise extends to video—especially MPEG-4 object video, audio—especially MIDI or MPEG-4 structured audio language, and virtual advertisements.

The use of a PostScript-like function to embed a watermark is further detailed in application Ser. No. 09/629,401.

An alternate method is that no desktop tool has watermarking capability, but instead an on-line watermarking server is available to support common image formats. A variety of tools are enabled to submit images to the server with information regarding the desired parameters of the watermark. The server then returns the image to the application. In this way, the burden of integration is virtually eliminated and the registration and marking take place simultaneously.

The watermarks in content, such as an image, can be used by web page designing software to automatically cause actions to happen, such as automatically add the correct hyperlink for that image into the web page being designed, controlling secure transfer (encryption) of the image in web page. For example, the web authoring tool screens for watermark in images, goes to a central or distributed database and obtains the current link for that image and metadata about that image. The web design tool can place that metadata into a standard form with the image on the web page. In another example, a user drags the image of a house onto web page and web authoring tool screens the watermark, uses it to link to the database, the database returns the pertinent hyperlink to be placed on the web page when that image is clicked and other metadata which is automatically formatted and added to the web page. When watermarked content is dynamically added to web pages at render time, possibly via the use of scripts that determines the correct image or ad to place in the web page at rendering time, the watermark is used to determine the correct hyperlink for the image. Specifically, the web server or dynamic administrator that adds the content screens the watermark and inserts the correct link into the HTML document.

The system can use data embedded in the header, footer or frame of the content, such as a link and description in the header. In this case, the link in the header of the content is added to the HTML of the web page by the web authoring tool. The system can use a watermark, where the watermark is minimally perceptible and includes around 32-bits of data, and a secondary database lookup to find the desired link and information to automatically be added to the web page during authoring. Finally, the system can use a watermark that contains the information to be added to the web page. For example, the watermark may contain the lyrics of a song, which are added to the HTML web page automatically by the authoring tool when the song is added to the web page. This watermark requires around 30 bits per seconds, which is currently obtainable with non-robust watermarks and will be obtainable with robust watermarks in the future.

The watermark could help the web authoring tool link to a digital asset management (DAM) database, which could provide more information about the content. With the correct template and DAM system, dragging an image into a web authoring tool could cause the whole page to be instantly created.

Intereliant Watermarks

One watermark (or non-watermark meta data) can convey information about a second watermark in the same object. For example, the first watermark can identify a particular algorithm used to encode the second watermark. By decoding the first watermark, information useful in decoding the second watermark is obtained. The first watermark can have a low information content, and thus be relatively inconspicuous. The second can have a much higher information content (e.g., a unique ID identifying the content). By knowing particular information about the second watermark (e.g., the particular encoding algorithm), it can more reliably be decoded without increasing its energy (and visibility).

Text Watermarking

For text watermark, the watermark could add spaces at end of text. The spaces at the end of the line or characters in each line can be used to represent 1's and 0's. For example a line with an even number of characters is a 1 and odd number of characters is 0. In addition, only certain lines could be used, such as lines with specific text. For example, in watermarking news stories, only the lines with the text "AP wire" is watermarked. The watermark can identify the story or distributor, for forensic tracking.

In addition, the data to be embedded can be modified by a function related to the original text, such as a hash of the text. This way it is difficult to duplicate the watermark.

To provide a comprehensive disclosure without unduly lengthening this specification, the patents and applications cited above are incorporated herein by references.

Having described and illustrated the subject technologies with reference to illustrative embodiments, it should be recognized that the invention is not so limited.

For example, while the detailed description focused on digital watermarks to convey auxiliary information with audio and video content, other techniques can be used as well (e.g., VBI, digital fingerprints, header meta data, etc.). Likewise, in embodiments relating to marking of physical objects, other machine-readable data representations can be employed (e.g., bar codes, glyphs, RF IDs, mag stripes, smart card technology, etc.).

The implementation of the functionality described above (including watermark decoding) is straightforward to artisans in the field, and thus not further belabored here. Conventionally, such technology is implemented by suitable software, stored in long term memory (e.g., disk, ROM, etc.), and transferred to temporary memory (e.g., RAM) for execution on an associated CPU. In other implementations, the functionality can be achieved by dedicated hardware, or by a combination of hardware and software. Reprogrammable logic, including FPGAs, can advantageously be employed in certain implementations.

It should be recognized that the particular combinations of elements and features in the above-detailed embodiments are exemplary only; the interchanging and substitution of these teachings with other teachings in this and the incorporated-by-reference patents/applications are also contemplated.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

We claim:

1. A method of video content delivery comprising:
receiving from an electronic communication network, using one or more electronic processors, entertainment video content comprising at least one watermark;
receiving from the electronic communication network a promotional message that is separate from the entertainment video content;
detecting a watermark calibration signal using a hardware decoder in the one or more electronic processors, to locate the at least one watermark in the entertainment video content;
selecting, using the one or more electronic processors, the promotional message based upon at least the located at least one watermark; and
embedding, using the one or more electronic processors, the selected promotional message into the entertainment video content at a location based upon at least the at least one watermark.

2. A system comprising:
one or more electronic processors configured to:
receive video entertainment content from an electronic communication network, wherein the video entertainment content comprises at least one watermark;
receive from the electronic communication network a promotional message that is separate from the entertainment video content;
detecting a watermark calibration signal with a hardware decoder to locate the at least one watermark in the entertainment video content;
select the promotional message based at least upon the located at least one watermark; and embed the selected promotional message into the entertainment video content at a location based at least upon the at least one watermark.

3. The system of claim 2, wherein the one or more electronic processors are further configured to determine a reward for rendering the promotional message, wherein the reward comprises a discount for a product promoted by the promotional message.

4. The system of claim 2, wherein the one or more electronic processors are further configured to display an on-screen signal with the entertainment content to indicate that an opportunity exists for the user to earn credit by viewing additional information.

5. The method of claim 1, wherein the selecting the promotional message based at least upon the located at least one watermark comprises selecting the promotional message based at least upon a time.

6. The method of claim 1, further comprising:
rendering at least a portion of the entertainment video content;
rendering the promotional message;
determining if the promotional message was completely rendered; and
charging for the rendering of the at least a portion of the entertainment video content based at least upon the determining if the promotional message was completely rendered.

7. The method of claim 1, wherein the entertainment video content comprises a plurality of watermarks including the at least one watermark, wherein the sensing the at least one watermark comprises sensing two or more of the plurality of watermarks, wherein the method further comprises:
determining to insert the promotional message based at least upon a number of sensed watermarks.

8. The method of claim 1, wherein the selecting the promotional message based at least upon the sensed at least one watermark comprises selecting a personalized promotional message.

9. The method of claim 1, wherein the at least one watermark indicates a programming subject of the entertainment video content, and wherein the selecting the promotional message based at least upon the sensed at least one watermark comprises selecting the promotional message based at least upon the indicated programming subject.

10. The method of claim 1, further comprising displaying an on-screen signal with the entertainment content to indicate that an opportunity exists for the user to earn credit by viewing additional information.

11. The system of claim 2, wherein the one or more electronic processors are further configured to select the promotional message based at least upon a time.

12. The system of claim 2, wherein the one or more electronic processors are further configured to:
render at least a portion of the entertainment video content;
render the promotional message;
determine if the promotional message was completely rendered; and
charge for the rendering of the at least a portion of the entertainment video content based at least upon the determining if the promotional message was completely rendered.

13. The system of claim 2, wherein the entertainment video content comprises a plurality of watermarks including the at least one watermark, wherein the one or more electronic processors are further configured to:
sense two or more of the plurality of watermarks; and
determine to insert the promotional message based upon at least a number of sensed watermarks.

14. The system of claim 2, wherein the promotional message comprises a personalized promotional message.

15. The system of claim 2, wherein the at least one watermark indicates a programming subject of the entertainment video content, and wherein the one or more electronic processors are further configured to determine the promotional message based in part on the programming subject.

16. A non-transitory computer-readable medium, having instructions stored thereon, the instructions comprising:
instructions to receive entertainment video content from an electronic communication network, wherein the entertainment video content comprises at least one watermark;
instructions to receive, from the electronic communication network, a promotional message that is separate from the entertainment video content;
instructions to detect a watermark calibration signal using a hardware decoder, in the at least one watermark in the entertainment video content;
instructions to select the promotional message based upon at least the at least one watermark; and
instructions to embed the promotional message into the entertainment video content at a location based upon at least the at least one watermark.

17. The non-transitory computer-readable medium of claim 16, wherein the instructions to select the promotional message based upon at least the sensed at least one watermark comprises instructions to select the promotional message based upon at least a time.

18. The non-transitory computer-readable medium of claim 16, further comprising:
instructions to render at least a portion of the entertainment video content;
instructions to render the promotional message;
instructions to determine if the promotional message was completely rendered; and
instructions to charge for the rendering of the at least a portion of the entertainment video content based at least upon the determining if the promotional message was completely rendered.

19. The non-transitory computer-readable medium of claim 16, wherein the entertainment video content comprises a plurality of watermarks including the at least one watermark, wherein the sensing the at least one watermark comprises sensing two or more of the plurality of watermarks, wherein the instructions further comprises:
instructions to determine to insert the promotional message based upon at least a number of sensed watermarks.

20. The non-transitory computer-readable medium of claim 16, wherein the at least one watermark indicates a programming subject of the entertainment video content, and wherein the instructions to select the promotional message based upon at least the sensed at least one watermark comprises instructions to select the promotional message based upon at least the indicated programming subject.

* * * * *

UNITED STATES PATENT AND TRADEMARK OFFICE
CERTIFICATE OF CORRECTION

| | | |
|---|---|---|
| PATENT NO. | : | 9,843,846 B2 |
| APPLICATION NO. | : | 10/028751 |
| DATED | : | December 12, 2017 |
| INVENTOR(S) | : | Levy et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 5612 days.

Signed and Sealed this

Twenty-fifth Day of September, 2018

Andrei Iancu
*Director of the United States Patent and Trademark Office*